United States Patent [19]  
Potter

[11] 3,875,555  
[45] Apr. 1, 1975

[54] VEHICLE DETECTION SYSTEM
[75] Inventor: Thomas R. Potter, Los Alamitos, Calif.
[73] Assignee: Indicator Controls Corp., Gardena, Calif.
[22] Filed: May 29, 1973
[21] Appl. No.: 364,492

[52] U.S. Cl. ............................................. 340/38 L
[51] Int. Cl. ............................................. G08g 1/01
[58] Field of Search ................................. 340/38 L

[56] References Cited
UNITED STATES PATENTS
| | | | |
|---|---|---|---|
| 3,685,013 | 8/1972 | Brickner | 340/38 L |
| 3,818,430 | 6/1974 | Williams | 340/38 L |
| 3,820,100 | 6/1974 | Ballinger et al. | 340/38 L |

*Primary Examiner*—Kathleen H. Claffy
*Assistant Examiner*—Randall P. Myers
*Attorney, Agent, or Firm*—Jessup & Beecher; Keith D. Beecher

[57] ABSTRACT
An improved magnetic inductance vehicle detection system is provided which responds to changes in the inductance of a wire loop embedded in the roadway to sense the presence of a vehicle. The system includes a first oscillator connected to the loop whose frequency changes as the loop inductance changes, and it also includes a second oscillator whose frequency is independent of the loop inductance, and which is used as a reference. Appropriate logic circuitry establishes an output signal whenever the frequency of the loop oscillator increases with respect to the frequency of the reference osillator beyond a predetermined frequency differential, so as to indicate the fact that a vehicle has crossed in the area circumscribed by the loop. This output signal is formed into a direct current signal which actuates a relay in a vehicle indicating circuit. The system of the invention also includes a control circuit for compensating for drifts in the system. This control circuit includes a network which responds to an error signal to develop a fast-acting anti-drift control whenever the frequency of the loop oscillator falls below the frequency of the reference oscillator; and which also develops a slow-acting anti-drift control to compensate for frequency drifts in the system by which the frequency of the loop oscillator rises above the frequency of the reference oscillator.

8 Claims, 2 Drawing Figures

VEHICLE DETECTION SYSTEM

BACKGROUND OF THE INVENTION

Many different types of vehicle detection systems are presently in widespread use, either to control traffic signals, or for other purposes. One such prior art detection system uses an electric switch which is mechanically operated by a treadle mounted on the surface of the roadway. However, such mechanical treadle switches are expensive to install. Moreover, they are subject to considerable wear, and they require frequent maintenance.

Sub-surface magnetic inductance vehicle detection systems are also in use which employ inductive wire loops mounted beneath the surface of the roadway, and whose inductance changes as a vehicle crosses into the area circumscribed by the loop. Such prior art detection systems usually include an electronic detector circuit which senses the changes in inductance in the loop by measuring either a change in amplitude or phase shift of the output of an oscillator as its tank circuit is mistuned out of resonance, thereby detecting the presence of the vehicle.

The amount of inductance decrease in the loop in the prior art circuits is dependent upon the size and shape of the vehicle crossing into the loop, as well as upon the metallic content of the vehicle. The present day inductance detection systems of the type described in the preceding paragraph responds adequately to vehicles, such as normal sized automobiles and trucks. However, the prior art systems of the magnetic inductance type which utilizes resonance-responsive circuitry have exhibited an inability to respond with any degree of reliability to smaller vehicles, such as motorcycles, motor bikes, and smaller cars.

The aforesaid lack of sensitivity of the prior art magnetic inductance detection systems is due, inter alia, to the fact that its function depends upon resonance principles, and such systems are inherently incapable of exhibiting extreme sensitivities so as to be responsive to relatively small inductance changes in the loop. The vehicle detection system of the present invention, however, uses frequency-shift principles, and it is not subject to the inherent drawbacks of the prior art systems, insofar as sensitivity is concerned. The vehicle detection system of the present invention also utilizes a direct frequency measurement rather than either an amplitude change or a phase shift change. Prior art systems have not made use of the direct frequency measurement technique. The direct frequency approach provides superior sensitivity and hold time characteristics. Specifically, the inductance detection system of the present invention is capable of sensing and holding extremely small changes in the inductance loop, such as are created, for example, by motorcycles, small cars, and the like.

The magnetic inductance vehicle detection system of the present invention, as will be described, is ideally suited for application in traffic counting, as well as for operating traffic actuated signals. The detection system of the invention provides high sensi-ivity and adequate hold time, both characteristics being required for detecting and holding the presence of small vehicles within the inductive loop. The system includes a reference oscillator and a loop oscillator which exhibit a frequency differential in the presence of a vehicle within the loop. This frequency differential is sensed, and it exceeds a particular threshold, an output indication is produced. The system also incorporates an automatic tracking system between the two oscillators so that loop and circuit changes due to environmental or other conditions are automatically compensated.

The magnetic inductance vehicle detection system of the invention is basically frequency-sensitive in its concept and, as such, it exhibits high sensitivity and excellent hold time characteristics. These characteristics are achieved because the usual limiting factors in the prior art vehicle detection systems do not exist in the system of the invention.

The system of the invention, as will be described, includes an inductive loop embedded in the roadway and which is used as part of a resonant circuit for the loop oscillator. This means that the frequency of the loop oscillator is a function of loop inductance, and whenever a vehicle enters the area circumscribed by the loop, the inductance of the loop is lowered which, in turn, increases the frequency of the loop oscillator. It is clear, therefore, that should the loop oscillator frequency decrease with respect to the reference oscillator frequency, such a decrease is due only to environmental drift conditions, so that the tracking circuit may compensate the frequency difference on a rapid basis. However, when the frequency of the loop oscillator increases with respect to the reference oscillator, the increase may be caused to the presence of a vehicle, or to environmental drift conditions. Therefore, the compensation by the tracking circuit for the latter instance must proceed on a slower basis than in the former instance.

The reference oscillator is normally tuned to the same frequency as the loop oscillator, and each of the two oscillator signals is divided down by means of corresponding digital counter. Whenever the frequency of the loop oscillator increases until the frequency differential between it and the reference oscillator exceeds a particular threshold, a pulsating signal appears which is converted into a direct current voltage. The direct current voltage is used in appropriate indicating or control circuitry. Different sensitivities may be selected by changing the division factor of the digital counters, as will be described.

To achieve stability, the loop and reference oscillators must track in terms of frequency. The frequency difference of the two oscillators is monitored, so that whenever the loop oscillator frequency becomes lower than the reference oscillator frequency, indicating a frequency drift condition, an error signal is produced. This error signal is in the form of a pulsating signal, and it is fed as an input to a digital integrator. The resulting output of the integrator is used to increase the loop oscillator frequency at a relatively high correction rate, and this continues until the error signal disappears.

On the other hand, whenever the frequency of the loop oscillator becomes higher than the frequency of the reference oscillator, a condition which may be caused either by variations in the loop inductance due to environmental changes, or to the presence of a vehicle within the loop, the tracking circuit develops an extremely low rate error signal which is introduced to the input of the digital integrator so that correction to reduce the frequency of the loop oscillator may proceed at a relatively low rate for long term automatic tracking.

The system of the invention may be set to a "pulse" mode in which it generates an output pulse of predetermined width for each vehicle moving into the area circumscribed by the loop; or it may be set to a "presence" mode in which it produces an output signal in response to the presence of a vehicle within the loop. The system, in its "pulse" mode is well adapted for measuring or counting rapidly moving traffic. In the "presence" mode, the signal starts when the inductance of the loop is first decreased due to the close proximity of a vehicle, and it terminates when the inductance of the loop regains its previous value as the vehicle leaves the loop.

DETAILED DESCRIPTION OF THE ILLUSTRATED EMBODIMENT

Figure 1:
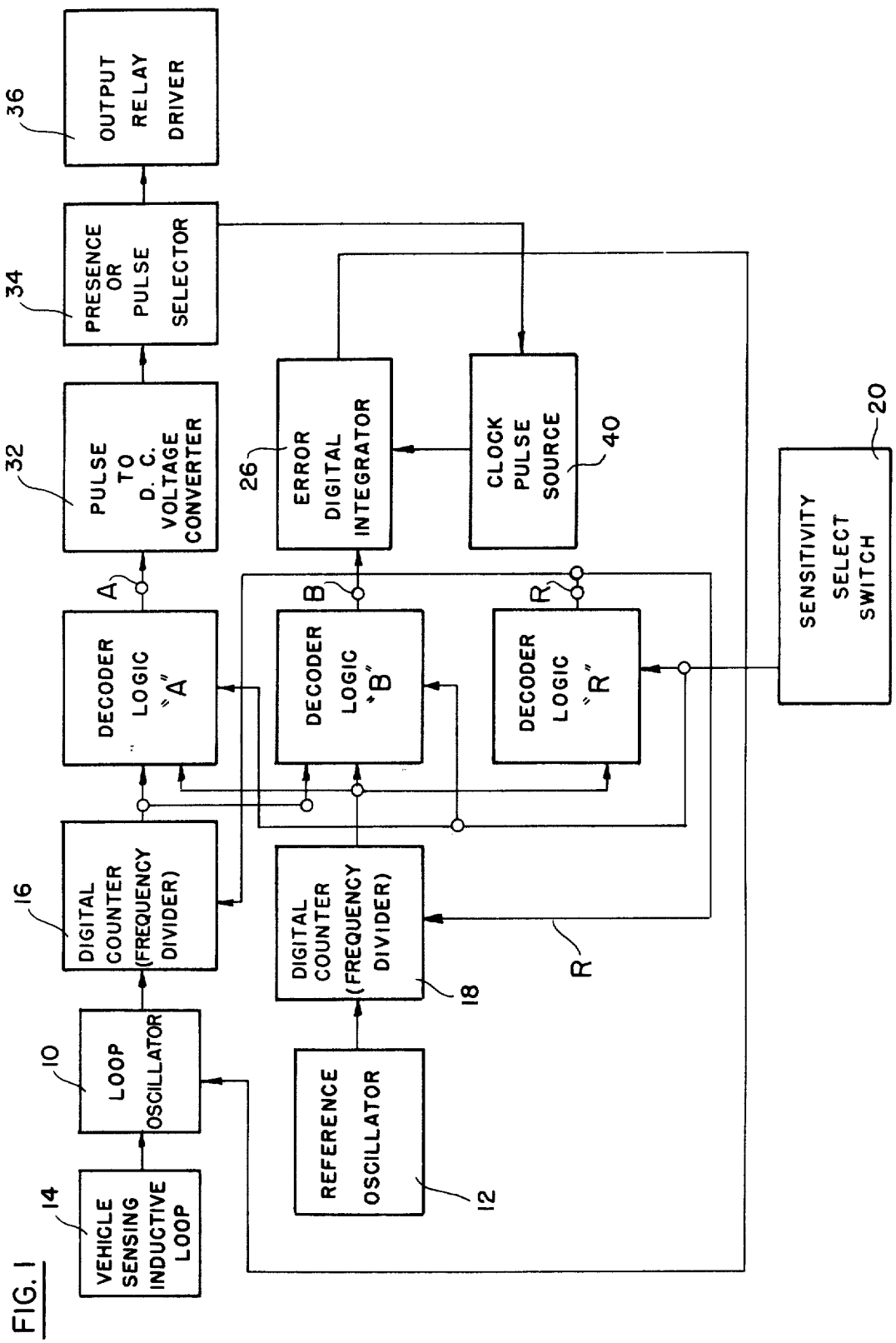
FIG. 1 is a block diagram of a vehicle detection system constructed to incorporate the concepts of the invention.

The system shown in the block diagram of FIG. 1 includes a loop oscillator 10 and a reference oscillator 12. The loop oscillator 10 is connected to an inductive loop 14 which, as mentioned above, is normally embedded in the roadway. The inductive loop 14 in a constructed embodiment of the invention comprises three or four turns of wire layed in a square rectangle under the roadway measuring, for example, 6 feet by 6 feet, and having an inductance of the order of 65-400 microhenries.

The frequency of the loop oscillator increases whenever the inductance of the loop 14 is decreased by a vehicle entering the area circumscribed by the loop. The frequency of the reference oscillator is independent of the loop inductance. The reference oscillator is tuned to the normal frequency of the loop oscillator.

The loop oscillator is connected to a frequency divider 16, and the reference oscillator 12 is connected to a frequency divider 18. Each of these dividers may be in the form of a digital counter. The dividers are controlled by a sensitivity select control switch 20, and they serve to divide down the frequency of the output signals from the respective oscillators 10 and 12 until an adequate resolution is obtained. For example, the resolution may be such as to distinguish one part of 50,000.

The outputs of the digital counters 16 and 18 are connected to three decoder logic networks designated "A", "B" and "R." The sensitivity select switch 20 is actually connected to the logic networks, as shown.

The decoder logic "A" develops a pulsating output voltage whenever the loop oscillator frequency increases above a predetermined threshold with respect to the reference oscillator frequency as established by the sensitivity select switch 20, indicating the presence of a vehicle. This pulsating output voltage is applied to a pulse-direct current voltage converter 32. The converter 32 responds to the pulsating output voltage of logic "A" to develop a corresponding direct voltage output which, in turn, is applied through a presence or pulse selector circuit 34 to an output relay driver 36.

As explained above, the presence or pulse selector 34 can be set to a "pulse" mode to generate a pulse of predetermined width whenever a vehicle enters the area circumscribed by the loop 14. Alternately, the selector 34 can be set to a "presence" mode in which it generates a continuous output for the time duration that the vehicle is present in the area circumscribed by the loop.

The decoder logic "B" develops a pulsating output whenever the frequency of the loop oscillator 10 falls below the frequency of the reference oscillator 12. Such a drop in the loop oscillator frequency indicates a drift in a loop inductance due to environmental conditions, since the presence of a vehicle results in an increase in frequency in the loop oscillator.

The pulsating output from the decoder logic "B" is an error signal which is applied to a digital integrator 26 which develops a direct current voltage that is applied to the loop oscillator 10. The direct current voltage developed by the digital integrator 26 serves to increase the frequency of the loop oscillator 10 until the pulsating signal developed by the decoder logic "B" disappears.

The error digital integrator 26 includes an up-down counter which counts in one direction in response to the pulsating signal from the decoder logic "B." A clock pulse source 40 is also connected to the integrator 26, and it applies clock pulses to the up-down counter to cause it to count in the opposite direction at a relatively slow rate. The rate, for example, is of the order of one pulse for every 2 seconds when the selector 34 is in the "pulse" position; and at a rate of one pulse for every 3 minutes when the selector 34 is in the "presence" position.

The clock pulse source 40 serves as a means for causing the loop oscillator 10 to have a tendency slowly to decrease its frequency. Therefore, should the frequency of the loop oscillator 10 drift to a frequency higher than the frequency of the reference oscillator 12 due to environmental changes in the loop 14, the pulses from the source 40 serve to bring the loop oscillator frequency down to the frequency of the reference oscillator 12. When the frequency of the loop oscillator 10 reaches the frequency of the reference oscillator 12, any further tendency for it to decrease is compensated by the resulting pulsating output from the decoder logic "B".

The tracking circuit, therefore, controls the frequency of the loop oscillator 10 in the presence of environmental inductance changes in the loop 14 so that the loop oscillator tracks the reference oscillator on a long term basis. This tracking is achieved by utilizing a device known as varactor. The varactor is a diode D1 whose capacitance is a function of the applied reverse voltage. The varactor is connected in parallel with the loop inductor.

Whenever the loop oscillator frequency decreases to a value lower than the frequency of the reference oscillator, the tracking system operates in the manner described quickly to restore the two oscillators to the same frequency. However, whenever the frequency of the loop oscillator drifts higher than the frequency of the reference oscillator, due to environmental changes in the inductance of the loop 14, the tracking system operates slowly to compensate for the latter drift, and to restore the frequency equality. The slow acting characteristic of the tracking circuit in reducing the frequency of the loop oscillator in the presence of drift, assures that the tracking circuit will not interfere with the normal response to the loop oscillator to a vehicle entering the loop area, which causes a rapid increase in frequency of the loop oscillator.

The system described is highly stable in that variations of loop paramenters as a function of time, environmental changes, and the like, are taken care of automatically by the tracking control of the system. Likewise, variations in oscillator frequencies due to component drifts, supply voltage changes, and temperature changes, are also automatically compensated on a continuous basis by the tracking system. Sensitivity selection of the system is precise and repeatable due to the digital concept on which it is based.

Figure 2:
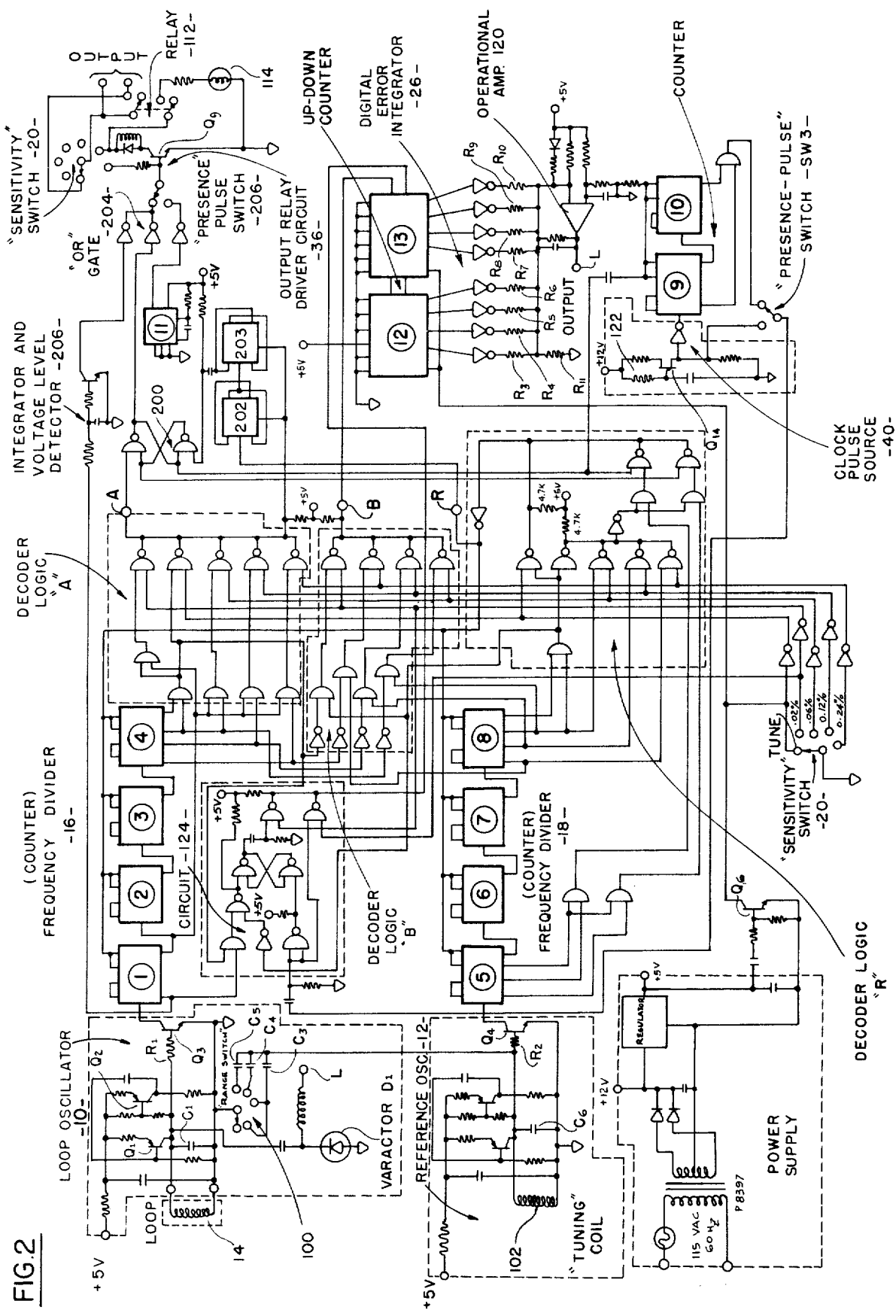
FIG. 2 is a more detailed circuit and logic diagram of the system of FIG. 1.

The loop oscillator 10, as shown in FIG. 2 includes a pair of PNP transistors Q1 and Q2 connected as shown. The loop 14 forms the inductive portion of the frequency determining circuit of the loop oscillator, the loop being tuned by a 2200 picofarad capacitor C1. The capacitor is shunted by the varactor D1 which in turn is controlled by the output of the error integrator 26 applied to a terminal L.

The reference oscillator 12 has a tuning coil 102 which is shunted by a 2200 picofarad capacitor C6 as its frequency determining circuit, and the capacitors C3, C4 and C5 are switched into the frequency determining circuit of the reference oscillator, as the range switch 100 is turned.

The sine wave output from the loop oscillator 10 is applied through a 15 kilo-ohm resistor R1 to an NPN transistor Q3. The sine wave output from the loop oscillator saturates the transistor Q3, so that a square wave is applied to the frequency divider 16. Likewise, the sine wave output from the reference oscillator 12 is applied through a 15 kilo-ohm resistor R2 to an NPN transistor Q4 to saturate the transistor Q4, so that a square wave is applied to the frequency divider 18.

The frequency dividers 16 and 18 are digital counters which are formed of a plurality of multiple flip-flop integrated circuits, as indicated by the blocks 1-8. The outputs from the digital counter frequency dividers are applied to the decoder logic circuits "A," "B" and "R." The logic circuits are also controlled by the sensitivity selects switch 20. The switch 20 has a position designated "tune," and subsequent positions designated 0.02 percent, 0.06 percent, 0.12 percent and .24%. These sensitivities can be altered to achieve any desired sensitivity by changing the decoding logic.

The decoder logic circuit "A" develops an output at the terminal A only when the frequency of the loop oscillator ($f_1$) is greater than the frequency of the reference oscillator ($f_r$). Also, the resulting frequency differential must exceed a certain threshold, as established by the setting of the sensitivity select switch 20. In each instance, a certain number of pulses must be applied by the counters to the decoder logic "A" within a time T for the decoder logic "A" to develop an output pulse at the output terminal A, and the time T is set by the sensitivity select switch 20. For example, if the counters 16 and 18 divide by 50,000 the switch 20 may be set so that the frequency $f_1$ must increase by five cycles, that is from 50,000 cycles to 50,005 cycles, in order for the decoder logic "A" to produce an output.

The resulting output pulses which appear at the output terminal A when the loop oscillator frequency ($f_1$) exceeds the reference oscillator frequency ($f_r$) beyond the established threshold, are applied to the set input of an R-S type flip flop 200, and to the direct clear inputs of two cascaded J-K type flip flops 202, 203. The output of the R-S flip flop connects to the input of a two input "OR" gate 204, and also to the input of a one-shot multivibrator 11. The output relay driver circuit is connected by a switch 206 (located on the front panel) to either the output of the "OR" gate 204 or the output of the one-shot multivibrator 11, depending on which mode of operation (presence or pulse) is desired.

The other input of the "OR" gate is connected to the output of a combined integrator and voltage level detector 206. The integrator is connected to the output of the first flip flop 1 of the counter 16 connected to the loop oscillator. The output signal of the level detector 206 is used as a fail signal (i.e. whenever the loop oscillator is not functioning properly, for example, shorted loop, open loop, etc.). The fail signal places a continuous vehicle detection signal at the detector output.

The pulse generated by a decoder logic "R" is used to clock the two J-K flip flops 202, 203. Whenever two consecutive pulses from decoder logic "R" appear simultaneously with the absence of pulses from decoder logic "A" the second J-K flip flop 203 changes state and passes a pulse to reset the R-S flip flop 200. The R-S flip flop 200 will remain in the reset state until another pulse from decoder logic "A" is present at the set input of the R-S flip flop.

The transistor Q9 in the relay driver circuit 36 controls the current through a relay 112. When the relay is energized, its adjacent contacts assume the illustrated position, so that a panel indicator lamp 114 is extinguished, and an appropriate signal is sent to the controller. When a vehicle enters the loop area, the relay is de-energized which in turn illuminates the panel lamp and also produces the appropriate control signal for the controller.

The decoder logic "R" is used to reset the counters 16 and 18 after a predetermined count has been achieved, as determined by the setting of the sensitivity select switch 20.

The decoder logic "B" develops a pulsating output at the terminal B whenever the loop oscillator frequency ($f_1$) falls below the frequency of the reference oscillator ($f_r$), indicating a frequency drift condition. The pulses at the terminal B are applied to an up-down counter within the digital error integrator 26, the up-down counter being represented by blocks 12 and 13, formed by appropriate integrated circuits. The blocks 12 and 13 are connected to a series of reference resistors R3-R10 having values of 3.75, 7.5, 30, 60, 120, 240 and 480 kilo-ohms respectively. These resistors are connected to a resistor R11. The resistor R11 may have a resistance of 2.8 kilo-ohms. These components form what is commonly known as a digital to analog converter. Other digital to analog converter circuits would be equally as effective.

The reference resistors R3-R10 are also connected to the input of an operational amplifier 120, whose output terminal L supplies the bias voltage to the varactor D1 in the loop oscillator 10. Whenever pulses appear at the terminal B, the up-down counter 12, 13 of the digital error integrator 26 is stepped in a first direction so as to establish an increasing voltage at the terminal L to cause the loop oscillator frequency ($f_1$) to increase and eliminate the differential between it and the reference oscillator, so that the pulses at the point B will disappear, causing the counter 12, 13 to stop. In this way, high speed automatic tracking between the loop and reference oscillators is achieved, whenever the loop oscillator frequency falls below the reference oscillator frequency.

The clock pulse source 40 includes an oscillator circuit 122 which includes a unijunction transistor Q14. The unijunction transistor may be of the type designated 2N2656. The oscillator 122 produces a constant frequency signal which is applied to a counter formed of the integrated circuit blocks 9 and 10. This counter divides the frequency of the oscillator 122 so that, for example, a pulse is produced every 2 seconds when a switch SW3 is at one position, and a pulse is produced, for example, every 3 minutes when the switch SW3 is at a second position. The reset inputs of the counters are connected to the output of decoder logic "A." Therefore, a minimum hold time is guaranteed from the time the vehicle is detected until the tracking circuit begins to tune out the vehicle.

The pulses from the counter 9, 10 are applied to the updown counter 12, 13 through a circuit 124, and they step the latter counter in the opposite direction to the stepping due to the pulses at the terminal B. Therefore, the counter 12, 13 is continuously stepped slowly in a direction which produces a slowly decreasing voltage at the terminal L, slowly to decrease the loop oscillator frequency ($f_1$).

When the system is in the "presence" mode, this decrease is extremely slow, of the order of one pulse every three minutes from the clock pulse source; and when the system is in the "pulse" mode, the control is somewhat faster, or the order of one pulse every two seconds from the clock pulse source. This control provides that should the loop oscillator frequency drift to a value higher than the reference oscillator frequency, the frequency of the loop oscillator is gradually decreased back towards the frequency of the reference oscillator frequency. When the frequencies of the two oscillators are the same, any further attempt by the clock pulse source 40 to decrease the loop oscillator frequency is compensated by the appearance of pulses at the terminal B.

A further circuit associated with an NPN transistor Q16 is provided so that when the sensitivity select switch 20 is set to "tune", or when the system is first turned on, the up-down counter 12, 13 within the digital error integrator 26 is set near its mid-range, so that it has room to be controlled in either direction by subsequent action of the tracking circuit. Thus, when the detector system is initially tuned, the error integrator 26 is locked to mid-scale. This locking control by the sensitivity switch overrides any other controls which may previously have been exerted on the up-down counter.

With the sensitivity select switch 20 at the "tune" position, the tuning coil 102 of the reference oscillator 12 is tuned so that the frequency of the reference oscillator and of the loop oscillator 10 will be the same. This state is indicated by the fact that the indicator light 114 will be first energized when equality between the frequencies is achieved, indicating that output pulses are just beginning to appear at the terminal A. Then, the sensitivity select switch 20 can be set to any desired sensitivity setting.

An "anti-toggle" control is incorporated into the system, whereby the flip flop 200 develops a signal which is applied to the decoder logic R. This signal provides a hysteresis effect for each sensitivity setting, by which the system has two decoding thresholds. That is, for any setting of the sensitivity switch 20, the system has a first decoding threshold for an output first to appear at the terminal A, and it has a second decoding threshold after an output has appeared at the terminal A. For example, before an output appears at A, a division of the reference may be set for 49,995. Then, after an output appears at A, the decoding threshold is automatically changed, for example, to 49,997, providing a hysteresis of two cycles out of 50,000. This control eliminates any tendency for the system to "toggle" when the system is just at the response threshold.

The invention provides, therefore, an improved inductive vehicle detection system which operates on frequency shift principles, and which is highly sensitive and capable of providing a positive indication whenever a vehicle enters into the field of the inductive loop, even in the case of motorcycles and the smaller cars. Also, the system of the invention incorporates an automatic tracking circuit, so that the system is self-compensating for drifts in the oscillator frequencies due to any cause.

Although two separate oscillators are used in the system described above, a single oscillator could be used, and implemented in the following way: The loop oscillator frequency ($f_1$) could be sampled and stored at time ($t_1$). At time ($t_2$), new frequency information ($f_2$) would be compared to frequency information stored at ($t_1$) if $f_2 - f_1 = K$ where K equals a predetermined threshold, this would represent the presence of a vehicle. $F_1$ could be incremented up at a low rate to correct for drifts. $F_2$ and $f_1$ would be periodically compared and if $f_2 - f_1 = 0$ then the value for $f_1$ would change to equal that of $f_2$.

Although a digital system is described above, analog techniques could be used, including, for example, an analog frequency mixer, an analog integrator, and so on. Moreover, the frequency measuring technique could be implemented by utilizing a phase-lock-loop scheme where a second oscillator is phase locked to the first oscillator and direct current control voltage for the second oscillator is used at the information signal.

Although a particular embodiment of the invention has been shown and described, modifications may be made. It is intended in the following claims to cover the modifications which fall within the spirit and scope of the invention.

What is claimed is:

1. An inductive type of vehicle detection system including: an inductive loop to be placed in position to sense the presence of a metallic vehicle; first pulse generating means including a first oscillator circuit connected to the loop and utilizing the loop as a frequency determining element; second pulse generating means including a second oscillator circuit; logic circuit means connected to said first and second pulse generating means for developing output pulses when the frequency differential between said oscillator circuits exceeds a predetermined threshold; and output circuit means connected to said logic circuit means for developing a control signal in response to said output pulses, in which said first and second pulse-generating means includes first and second digital counters respectively connected to the outputs of said first and second oscillator circuits for providing a predetermined frequency division to the outputs therefrom.

2. An inductive type of vehicle detection system including: an inductive loop to be placed in position to sense the presence of a metallic vehicle; a first oscillator circuit connected to the loop and utilizing the loop as a frequency determining element; a second oscillator circuit; first logic circuit means connected to said first and second oscillating circuits for developing output pulses only when the frequency of said first oscillator exceeds the frequency of said second oscillator by a predetermined threshold; output circuit means connected to said logic circuit means for developing a control signal in response to said output signal, and which includes further logic circuit means connected to said first and second oscillator circuits for developing output pulses when the frequency of said first oscillator circuit falls below the frequency of said second oscillator circuits; an error integrator network connected to said first logic circuit means for developing an increasing direct current output voltage in response to said output pulses from said further logic circuit means; and a circuit connected to said integrator for applying said increasing direct current output voltage to said first oscillator to increase the frequency of said first oscillator towards the frequency of said second oscillator.

3. The vehicle detection system defined in claim 2, and which includes a source of clock pulses connected to said integrator for introducing predetermined time clock pulses to said integrator to cause said integrator to develop a direct current output voltage which decreases at a relatively slow rate as compared with the aforesaid increase of said direct current output voltage in response to said output pulses from said further logic circuit means to decrease the frequency of said first oscillator whenever said first oscillator frequency drifts above the frequency of said second oscillator.

4. The vehicle detection system defined in claim 3, in which said error integrator includes an up-down counter responsive to said output pulses from said further logic circuit means for counting in one direction, and responsive to clock pulses from said source of clock pulses for counting in the other direction; and a resistance network connected to said up-down counter for developing an output voltage corresponding to the count of said counter.

5. An inductive type of vehicle detection system including: an inductive loop to be placed in position to sense the presence of a metallic vehicle; a first oscillator circuit connected to the loop and utilizing the loop as a frequency-determining element; a second oscillator circuit; logic circuit means connected to said first and second oscillator circuits for developing output pulses when the frequency differential between said oscillator circuits exceeds a predetermined threshold; and output circuit means connected to said logic circuit means for developing a control signal in response to said output pulses, and which includes a network for changing said predetermined threshold from a first level to a second level whenever said logic circuit means develops output pulses, and in response to such output pulses.

6. An inductive type vehicle detection system including: an inductive loop to be placed in position to sense the presence of a metallic vehicle; a first oscillator circuit connected to the loop and utilizing the loop as a frequency determining element; a second oscillator circuit; vehicle detection logic circuit means connected to said first and second oscillator circuits for developing output pulses upon the occurrence of a frequency differential between said first and second oscillator circuits beyond a predetermined threshold indicating a rise in the frequency of the first oscillator circuit as compared with the frequency of the second oscillator circuit; output circuit means connected to said vehicle-detection logic circuit means for developing a control signal in response to said output pulses; signal-drift logic circuit means connected to said first and second oscillator circuits for developing output pulses upon the occurrence of a frequency differential between said first and second oscillator circuits indicating a drop in the frequency of said first oscillator circuit as compared with the frequency of said second oscillator circuit; an error digital integrator connected to said signal-drift logic circuit means for developing a varying direct current output voltage in response to the output pulses from said signal-drift logic circuit means; and a circuit connected to said digital integrator for applying said direct current output voltage therefrom to said first oscillator to vary the frequency thereof in a direction to reduce said last-named frequency differential.

7. The vehicle detection system defined in claim 6, in which said digital integrator includes a up-down counter responsive to the pulses from said logic circuit means for counting in one direction; and a resistance network connected to said up-down counter for developing an output direct current voltage having a value dependent upon the count of said counter.

8. The vehicle detection system defined in claim 7, and which includes a clock source connected to said digital integrator for introducing clock pulses to said counter to cause said counter to count in the opposite direction, said clock pulses recurring at a relatively low rate with respect to the pulses from said logic circuit means.

* * * * *